United States Patent
Xu et al.

(10) Patent No.: US 9,102,782 B2
(45) Date of Patent: Aug. 11, 2015

(54) TRANSPARENT COPOLYESTER, PREPARING METHOD THEREOF AND ARTICLES MADE FROM THE SAME

(75) Inventors: Ning Xu, Beijing (CN); Guixiang Zhu, Beijing (CN); Wei Zhang, Beijing (CN); Ling Han, Beijing (CN); Yi Zou, Beijing (CN); Wenxi Ji, Beijing (CN)

(73) Assignees: China Petroleum & Chemical Corporation, Beijing (CN); Beijing Research Institute of Chemical Industry, China Petroleum & Chemical Coporation, Beijing (CN)

( * ) Notice: Subject to any disclaimer, the term of this patent is extended or adjusted under 35 U.S.C. 154(b) by 0 days.

(21) Appl. No.: 13/571,317

(22) Filed: Aug. 9, 2012

(65) Prior Publication Data

US 2013/0041130 A1    Feb. 14, 2013

(30) Foreign Application Priority Data

Aug. 12, 2011   (CN) .......................... 2011 1 0231138
Aug. 12, 2011   (CN) .......................... 2011 1 0231140

(51) Int. Cl.
| | |
|---|---|
| *C08G 18/42* | (2006.01) |
| *C08G 63/60* | (2006.01) |
| *C08G 63/91* | (2006.01) |
| *C08G 18/73* | (2006.01) |
| *C08G 18/34* | (2006.01) |

(52) U.S. Cl.
CPC .......... *C08G 18/4216* (2013.01); *C08G 18/348* (2013.01); *C08G 18/73* (2013.01); *C08G 63/60* (2013.01); *C08G 63/91* (2013.01)

(58) Field of Classification Search
CPC .. C08G 18/73; C08G 18/348; C08G 18/4216; C08G 63/60; C08G 63/91
USPC .......................... 525/437, 410, 411, 415, 450
See application file for complete search history.

(56) References Cited

U.S. PATENT DOCUMENTS

| | | | |
|---|---|---|---|
| 5,403,897 A | 4/1995 | Ebato et al. | |
| 5,605,981 A * | 2/1997 | Imamura et al. | ......... 525/440.04 |
| 2006/0276617 A1* | 12/2006 | Yano et al. | ..................... 528/272 |

FOREIGN PATENT DOCUMENTS

| | | |
|---|---|---|
| CN | 1673276 | 9/2005 |
| CN | 1687205 | 10/2005 |
| CN | 1807485 | 7/2006 |
| CN | 1911983 | 2/2007 |
| CN | 1927911 | 3/2007 |
| CN | 101024696 | 8/2007 |
| CN | 101134807 | 3/2008 |
| CN | 101314666 | 12/2008 |
| CN | 101338025 | 1/2009 |
| CN | 101585827 | 11/2009 |
| CN | 101684175 | 3/2010 |
| CN | 1011983986 | 3/2011 |
| JP | 7-268057 A | 10/1995 |
| JP | 2004-285151 | 10/2004 |
| WO | WO 02/44249 | 6/2002 |

OTHER PUBLICATIONS

Yuan, H., et al.; Engineering Plastics Applications, 2008, vol. 36, Issue 10, p. 46-50.*
Herrera, R., et al.; Journal of Polymer Science Part A: Polymer Chemistry, 2002, p. 4141-4157.*
Fernandez, R.T., et al.; Polymer Degradation and Stability, 2010, p. 2641-2647.*

* cited by examiner

*Primary Examiner* — Robert Jones, Jr.
(74) *Attorney, Agent, or Firm* — Novick, Kim & Lee, PLLC; Allen Xue

(57) ABSTRACT

The present invention relates to a transparent copolyester, wherein the transparent copolyester comprises an aliphatic-aromatic copolyester segment A, a segment B having repeating units —O—CH(CH$_3$)—C(O)—, and structural units C derived from polyisocyanate(s), wherein the weight ratio for the segment A, segment B and structural unit C is 100:(100-2000):(0.1-10) and wherein the weight-average molecular weight Mw of the transparent copolyester is from 50,000 to 1,000,000. The present invention further relates to a preparation method for a transparent copolyester, including polymerizing lactide, a hydroxyl-terminated aliphatic-aromatic copolyester and a polyisocyanate in the presence of a catalyst; wherein the weight ratio for the aliphatic-aromatic copolyester, lactide and polyisocyanate is 100:(100-2000):(0.1-10). The present invention further relates to a transparent copolyester prepared by said method and an article made from the transparent copolyester according to present invention.

22 Claims, 1 Drawing Sheet

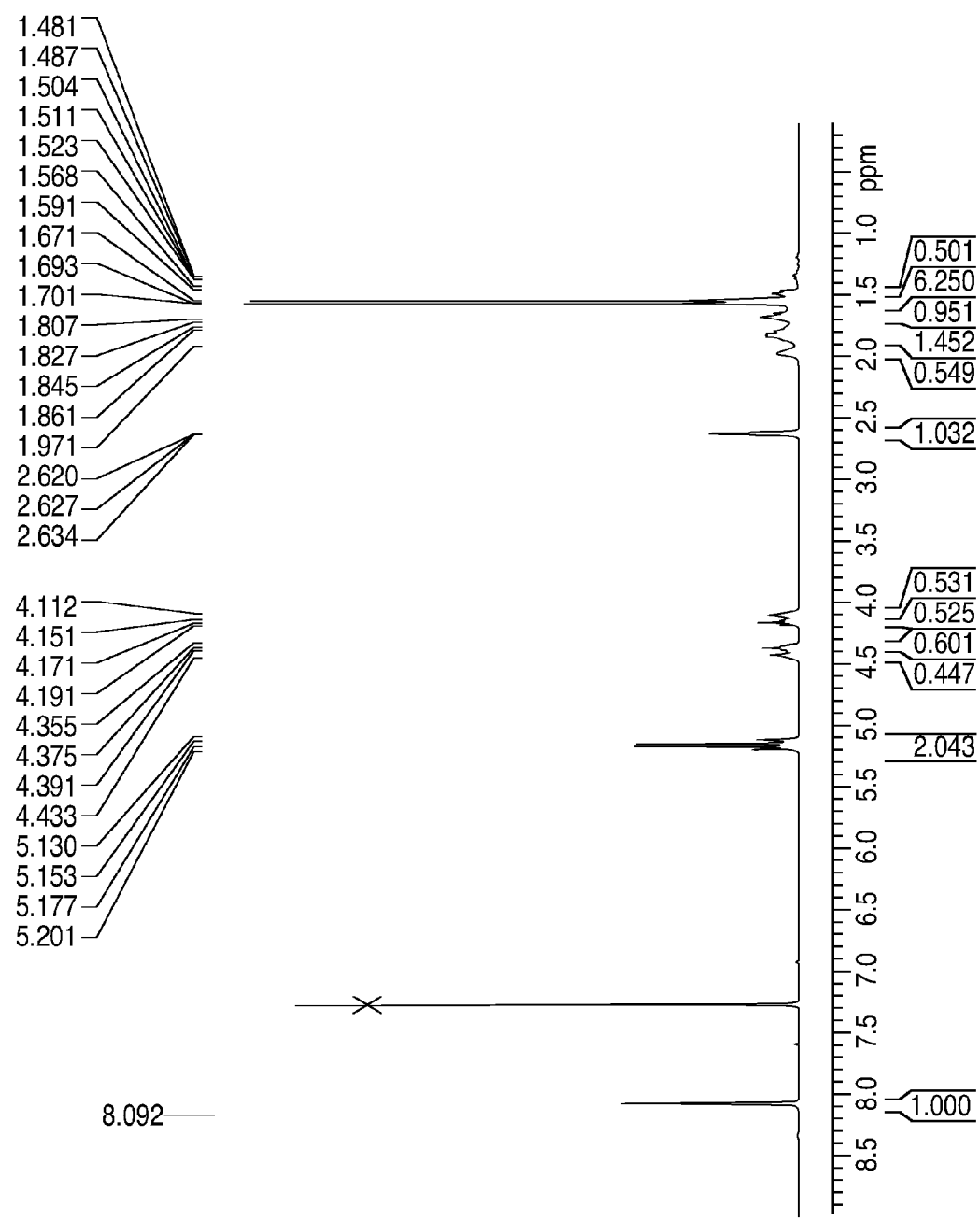

TRANSPARENT COPOLYESTER, PREPARING METHOD THEREOF AND ARTICLES MADE FROM THE SAME

TECHNICAL FIELDS

The present invention relates to a transparent copolyester, a preparing method for the transparent copolyester, a transparent copolyester prepared by the method and an article made from the transparent copolyester.

BACKGROUND

Polylactic acid is a well known biodegradable material. Since lactic acid can be derived from renewable resources, the development of lactic acid industry can reduce the demand for petroleum resources and is also beneficial to mitigate greenhouse effect. However, polylactic acid is brittle and has an insufficient toughness. Thus an important aspect for improving the mechanical properties of polylactic acid is to toughen the polylactic acid.

Copolymerization is an effective method to toughen polylactic acid. CN1911983A, for example, disclosed a preparing method of a degradable polymer material for shape memory endoluminal stents, wherein two of lactide, glycolide and caprolactone are ring-opening polymerized to provide a hydroxyl-terminated oligomer; and the resulting hydroxyl-terminated oligomer and a linear polyester are subjected to bulk polymerization so as to produce a degradable polymer material; wherein the linear polyester is a polycondensation product of an aliphatic diol and an aliphatic dicarboxylic acid or an aliphatic dicarboxylic anhydride.

Although methods known in prior art, which subject polylactic acid to copolymerization, can improve the toughness of polylactic acid, these methods can only produce opaque polylactic acid resin materials. The loss of the excellent inherent transparency of polylactic acid limits the applications of these polylactic acid materials greatly.

In order to produce a toughened polylactic acid material with transparency, a common way is to blend polylactic acid, a plasticizer, and a toughening agent, and so on. For example, it is disclosed in CN1673276A that a transparent polylactic acid can be prepared by blending polylactic acid, glycerol triacetate, a lubricant and so on; it is disclosed in CN101314666A that a transparent polylactic acid can be obtained by blending polylactic acid, a nanosilica, an amide compound and so on; it is disclosed in CN1687205A that a completely degradable, transparent and toughened polylactic acid material can be obtained by blending polylactic acid, polyvinyl alcohol, epoxidized soybean oil and so on; and it is disclosed in CN101983986A that a transparent and toughened polylactic acid material can be obtained by blending polylactic acid, a methyl methacrylate-butyl acrylate copolyester as toughening agent, a plasticizer and an antioxidant and so on.

However, polylactic acid resin materials prepared by blending suffer problems such as phase separation, bleeding of plasticizers, and so on. Therefore it is desirable to provide a transparent and toughened polylactic acid material without defect(s) of prior art.

SUMMARY OF THE INVENTION

An object of present invention is to provide a transparent copolyester. This transparent copolyester overcomes the low-transparency defect of polylactic acid resin materials prepared by prior art copolymerization methods and has a good toughness.

According to an embodiment of present invention, a transparent copolyester is provided, wherein the transparent copolyester comprises an aliphatic-aromatic copolyester segment A, a segment B having repeating units —O—CH(CH$_3$)—C(O)— (i.e. repeating units derived from lactic acid or lactide), and structural units C derived from a polyisocyanate, and wherein the weight ratio for the segment A, the segment B and the structural units C (segment A:segment B:structural units C) is 100:(100-2000):(0.1-10) and wherein the weight-average molecular weight Mw of the transparent copolyester is from 50,000 to 1,000,000.

According to an embodiment of present invention, the segment B is represented by formula (I) below:

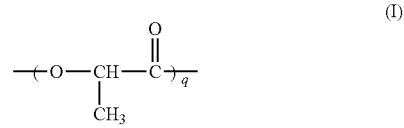

wherein q is an integer from 10 to 100.

According to an embodiment of present invention, the aliphatic-aromatic copolyester segment A is a random copolyester segment. In an embodiment of present invention, the aliphatic-aromatic copolyester segment A has a weight-average molecular weight Mw of 2,000-40,000, preferably 3,000-40,000. In another embodiment of present invention, in the aliphatic-aromatic copolyester segment A, the molar ratio between aliphatic polyester repeating units and aromatic polyester repeating units is 1:(0.1-10). According to a further embodiment, the terminal groups of the aliphatic-aromatic copolyester segment A are groups derived from a diol.

According to an embodiment of present invention, the aliphatic-aromatic copolyester segment A contains repeating units represented by formula (III) and repeating units represented by formula (IV), and wherein the chain terminals of the aliphatic-aromatic copolyester segment A are each independently —O—(CH$_2$)$_m$—O— or —O—(CH$_2$)$_p$—O—,

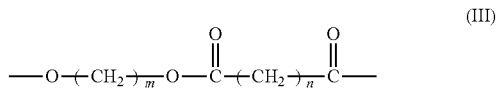

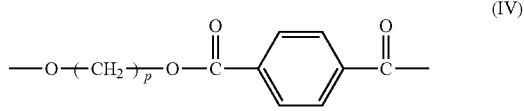

wherein the molar ratio between the repeating units represented by formula (III) and repeating units represented by formula (IV) is 1:(0.1-10), m is an integer from 2 to 10, n is an integer from 2 to 8, p is an integer from 2 to 10, and m, n and p are equal to or different from each other.

According to an embodiment of present invention, the structural units C derived from a polyisocyanate are structural units obtained after the reaction between the polyisocyanate and hydroxyl groups. According to an embodiment, the structural units C are represented by formula (II) below:

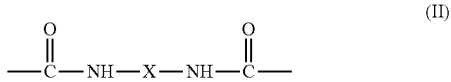

wherein X is a divalent aliphatic group and/or divalent aromatic group. According to a preferred embodiment, X is 1,6-hexamethylene and/or 4,4'-methylene diphenyl.

According to an embodiment, the polydispersity index (Mw/Mn) of the transparent copolyester of present invention is from 1.2 to 4, preferably from 1.5 to 2.5.

Another object of present invention is to provide a method for preparing a transparent copolyester, wherein the method comprises polymerizing lactide, a hydroxyl-terminated aliphatic-aromatic copolyester and a polyisocyanate in the presence of a catalyst; wherein the weight ratio for the aliphatic-aromatic copolyester, lactide and the polyisocyanate (aliphatic-aromatic copolyester:lactide:polyisocyanate) is 100:(100-2000):(0.1-10). According to an embodiment, the transparent copolyester prepared by said method has a weight-average molecular weight Mw of 50,000-1,000,000.

According to an embodiment of present invention, the catalyst used in said method is an organic tin compound. According to a further embodiment, the organic tin compound is selected from the group consisting of stannous octoate, stannous trifluoromethanesulfonate, dibutyltin dilaurate, stannous tartrate and dibutyldimethoxy tin. According to an embodiment of present invention, in the method of present invention, the amount of the organic tin compound used is from 0.05 to 0.5 parts by weight, preferably from 0.07 to 0.2 parts by weight, wherein the total weight of the lactide, the aliphatic-aromatic copolyester and the polyisocyanate is 100 parts by weight.

According to an embodiment of present invention, the aliphatic-aromatic copolyester used in the method has a weight-average molecular weight Mw of 2,000-40,000, preferably 3,000-40,000. According to another embodiment, the polydispersity index (Mw/Mn) of the aliphatic-aromatic copolyester is from 1.2 to 2.5.

According to an embodiment of present invention, in the preparation method of present invention, the reaction conditions for polymerization include a reaction temperature of from 130 to 190° C., preferably 170-190° C., and a reaction period of from 1 to 10 hours, preferably from 1.5 to 5 hours.

Another aspect of present invention relates to a transparent copolyester prepared from the method according to present invention.

A yet further aspect of present invention relates to an article made from the transparent copolyester according to present invention.

According to an embodiment of present invention, the transparency copolyester of present invention has a transmittance of at least 50%, preferably at least 60%, preferably at least 65%, preferably at least 70%, preferably at least 75%, and particularly preferably at least 80%, measured according to China National Standard GB/T 2410-2008.

According to another embodiment of present invention, the tensile strength at break of the transparent copolyester of present invention is from 19 to 50 MPa, preferably from 22 to 50 MPa, and more preferably from 25 to 50 MPa, measured according to China National Standard GB/T 1040.2-2006.

The transparent copolyester of present invention comprises or mainly comprises the polylactic acid segment (i.e. the segment B mentioned above) and the aliphatic-aromatic copolyester segment (i.e. the segment A mentioned above) such that the transparent copolyester not only has an excellent biodegradability, but also has a good toughness and transparency.

Without to be limited by any theory, it is believed that in the preparation method of present invention for the transparent copolyester, the lactide is bulk ring-opening polymerized under the initiation of the hydroxyl-terminated aliphatic-aromatic copolyester in the presence of a catalyst such as an organic tin compound, and the ring-opening polymerization product of lactide is subjected to reaction in the presence of the polyisocyanate (as water absorbent and chain extender), so as to provide a copolyester not only has an excellent biodegradability, but also has a relatively good toughness and transparency.

The transparent copolyester of present invention has a good toughness so as to overcome the brittle disadvantage of conventional polylactic acid materials, and also has a good transparency. The transparent copolyester of present invention is suitable for extrusion, film-blowing, film-drawing, bottle-blowing, injection moulding, foaming, sheeting and the like so as to obtain various articles. Moreover, the transparent copolyester of present invention has an excellent biodegradability. The article made from said transparent copolyester, when discarded, can be degraded via conventional biological degradation processes (such as composting process) without leading to environmental pollutions.

BRIEF DESCRIPTION OF THE DRAWINGS

FIG. 1 shows the $^1$H NMR spectrum for the transparent copolyester of example 1.

EMBODIMENTS OF THE INVENTION

A transparent copolyester is provided in present invention, wherein the transparent copolyester comprises an aliphatic-aromatic copolyester segment A, a segment B having repeating units —O—CH(CH$_3$)—C(O)—, and structural units C derived from a polyisocyanate, and wherein the weight ratio for the segment A, the segment B and the structural units C is 100:(100-2000):0.1-10 and wherein the weight-average molecular weight Mw of the transparent copolyester is from 50,000 to 1,000,000.

With respect to the transparent copolyester of present invention, the transparent copolyester not only has an excellent biodegradability, but also has a good toughness and transparency because the transparent copolyester contains mainly the polylactic acid segment and the aliphatic-aromatic copolyester segment.

According to an embodiment of present invention, the tensile strength at break of the transparent copolyester of present invention can be from 19 to 50 MPa, preferably from 22 to 50 MPa, and more preferably from 25 to 50 MPa.

According to another embodiment of present invention, the elongation at break of the transparent copolyester of present invention can be from 10 to 60%, preferably from 10 to 50%.

According to a further embodiment of present invention, the transparency copolyester of present invention can has a transmittance of at least 50%, preferably at least 60%, preferably at least 65%, preferably at least 70%, preferably at least 75%, even preferably at least 80%, preferably from 60 to 90%, and more preferably from 69 to 90%.

In present invention, the tensile strength at break and the elongation at break are measured according to China National Standard GB/T 1040.2-2006; and the transmittance is measured according to China National Standard GB/T 2410-2008.

The aliphatic-aromatic copolyester segment in present invention means a aliphatic-aromatic copolyester segment containing two types of dicarboxylic acid units, i.e. aromatic dicarboxylic acid units and aliphatic and/or cycloaliphatic dicarboxylic acid units, and aliphatic and/or cycloaliphatic diol units.

According to an embodiment, the aliphatic-aromatic copolyester segment A in the transparent copolyester of present invention is a random copolyester segment. The term "random" means the distributions of aliphatic polyester repeating units and aromatic polyester repeating units in the aliphatic-aromatic copolyester segment is stochastic. The aliphatic polyester repeating units means polyester repeating units obtained from the reaction between an aliphatic diacid, a cycloaliphatic diacid, an ester thereof or a mixture thereof and an aliphatic diol and/or an cycloaliphatic diol; and the aromatic polyester repeating units means polyester repeating units obtained from the reaction between an aromatic diacid, an ester of aromatic diacid, an anhydride of aromatic diacid or a mixture thereof and an aliphatic diol and/or an cycloaliphatic diol.

In the present invention, there are no particular limits to the aliphatic diacid and its ester, the cycloaliphatic diacid and its ester, the aliphatic diol, the cycloaliphatic diol, the aromatic diacid, the ester of aromatic diacid, and the anhydride of aromatic diacid, and compounds already known in the art for preparing polyesters can be used.

The aromatic dicarboxylic acid units in the aliphatic-aromatic copolyester segment, for example, are preferably derived from phthalic acid, isophthalic acid, terephthalic acid, 2,6-naphthalenedicarboxylic acid and the like. According to an embodiment, the aromatic dicarboxylic acid units can be derived from anhydrides of the aromatic dicarboxylic acids, or can be derived from esters of the aromatic dicarboxylic acids with an alcohol or a diol such as methanol. The aliphatic or cycloaliphatic dicarboxylic acid units in the aliphatic-aromatic copolyester segment are preferably derived from an aliphatic or cycloaliphatic dicarboxylic acid having from 4 to 20 carbon atoms, or can be derived from esters of the aliphatic or cycloaliphatic dicarboxylic acid with an alcohol or a diol such as methanol. Examples of the aliphatic dicarboxylic acid include, for example, malonic acid, succinic acid, glutaric acid, adipic acid, pimelic acid, azelaic acid, sebacic acid, dodecanedicarboxylic acid and the like. The cycloaliphatic diacid can be for example cyclohexane dicarboxylic acid. There are no particular limits to the diol units in the aliphatic-aromatic copolyester segment. The examples of the diol units can include the units derived from the following compounds: ethylene glycol, 1,3-propanediol, 1,4-butanediol, 1,5-pentanediol, 1,6-hexanediol, 1,8-octanediol, neopentyl glycol, cyclohexanedimethanol, hydrogenated bisphenol A and the like.

According to an embodiment of present invention, the weight-average molecular weight Mw of the aliphatic-aromatic copolyester segment A is from 2,000 to 40,000, preferably from 2,500 to 40,000, preferably from 3,000 to 40,000, preferably from 3000 to 30000, preferably from 3500 to 30,000, preferably form 3500 to 20,000 and more preferably from 3500 to 10,000. The weight-average molecular weight is measured according to Gel Permeation Chromatography (GPC), as described in following Example section.

According to an embodiment, the polydispersity index (Mw/Mn) of the aliphatic-aromatic copolyester segment A is from 1.1 to 4, preferably from 1.2 to 2.5.

According to another embodiment of present invention, in the aliphatic-aromatic copolyester segment A, the molar ratio between aliphatic polyester repeating units and aromatic polyester repeating units is 1:(0.1-10), preferably 1:(0.2-5), and more preferably 1:(0.5-2). A person skilled in the art will appreciate that the molar ratio between aliphatic polyester repeating units and aromatic polyester repeating units equals to the molar ratio between the aliphatic and/or cycloaliphatic dicarboxylic acid units and the aromatic dicarboxylic acid units in the aliphatic-aromatic copolyester segment.

According to an embodiment of present invention, the terminal groups of the aliphatic-aromatic copolyester segment A are groups derived from a diol; that is, the end groups of the aliphatic-aromatic copolyester segment are diol units. A person skilled in the art will appreciate that a diol-terminated aliphatic-aromatic copolyester can be obtained by using an excess amount of diol, relative to the total amount of the aliphatic and/or cycloaliphatic dicarboxylic acid and the aromatic dicarboxylic acid.

According to a preferred embodiment of present invention, the aliphatic-aromatic copolyester segment A contains repeating units represented by formula (III) and repeating units represented by formula (IV), and wherein the chain terminals of the aliphatic-aromatic copolyester segment A are each independently —O—$(CH_2)_m$—O— or —O—$(CH_2)_p$—O—,

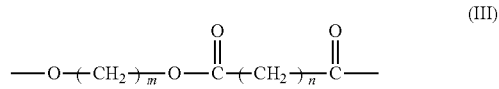

(III)

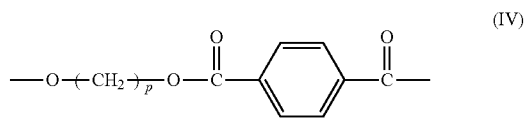

(IV)

wherein m is an integer from 2 to 10, preferably an integer from 2 to 6, for example m is 4; n is an integer from 2 to 8, preferably an integer from 2 to 4, for example n is 4; p is an integer from 2 to 10, preferably an integer from 2 to 6, for example p is 4; and m, n and p can be equal to or different from each other. According to a further preferred embodiment, the molar ratio between the repeating units represented by formula (III) and repeating units represented by formula (IV) is 1:(0.1-10), preferably 1:(0.2-5), and more preferably 1:(0.5-2). In a further embodiment, m equals to p.

According to a preferred embodiment, the weight ratio for the segment A, the segment B and the structural units C in the transparent copolyester of present invention is 100:(300-700):(1-5). The transparent copolyester with such a ratio has a further improved toughness and transparency.

According to a preferred embodiment, the transparent copolyester of present invention preferably has a weight-average molecular weight of from 50,000 to 500,000, preferably from 60,000 to 300,000, more preferably from 70,000 to 200,000.

According to a preferred embodiment, the polydispersity index of the transparent copolyester of present invention is from 1.2 to 4, preferably from 1.5 to 2.5.

According to an embodiment of present invention, the segment B in the transparent copolyester of present invention is represented by formula (I) below:

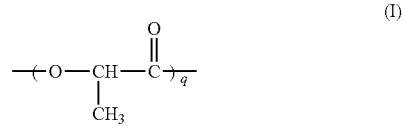

(I)

wherein q is an integer from 10 to 100, preferably an integer from 15 to 90, and more preferably an integer from 20 to 80.

According to an embodiment of present invention, the segment B can be resulted from the ring-opening polymerization of lactide. The lactide used in this invention is a compound formed by the cyclic dimerization of lactic acid and includes stereoisomeric monomers. That is, the isomers of the lactide include L-lactide, D-lactide, the mixture of D-lactide and L-lactide, D,L-lactide and meso-lactide. It is preferred to use D,L-lactide and L-lactide in the present invention. According to a preferred embodiment, the lactide used is L-lactide to make the final transparent copolyester have a better transparency.

In the present invention, the lactide can be various commercial available lactide products. Although L-lactide is commercial available, L-lactide can also be prepared through conventional methods. For example, L-lactide can be obtained via the methods disclosed in CN101585827A (particularly examples 1-8 therein).

As mentioned above, the structural units C in the transparent copolyester of present invention are derived from a polyisocyanate. There are no particular limits to the polyisocyanate and various polyisocyanates commonly known in the art can be used.

Suitable polyisocyanates are polyisocyanates represented by following formula:

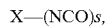

X—(NCO)s, wherein s=2 to 5, preferably s is 2 or 3, and X represents an aliphatic hydrocarbon radical having 4 to 36 carbon atoms, preferably having 5 to 14 carbon atoms, a cycloaliphatic hydrocarbon radical having 6 to 15 carbon atoms, an aromatic hydrocarbon radical having 8 to 22 carbon atoms, preferably having 6 to 15 carbon atoms or an araliphatic hydrocarbon radical having 7 to 15 carbon atoms.

Examples of the polyisocyanate include, but not limited to, 1,4-, 1,3- and/or 1,2-cyclohexane-diisocyanate, 1-methyl-2,4-diisocyanato-cyclohexane, 1-methyl-2,6-diisocyanato-cyclohexane, tetramethylene-diisocyanate, octamethylene-diisocyanate, decamethylene-diisocyanate, dodecamethylene-diisocyanate, $H_6$-2,4- and/or 2,6-diisocyanatotoluene, 4,4'-diisocyanatodiphenylmethane, 2,4'-diisocyanatodiphenylmethane, 2,2'-diisocyanatodiphenylmethane, meta- and/or para-xylylene-diisocyanate, 2,4-diisocyanatotoluene and/or 2,6-diisocyanatotoluene, isopropenyldimethyltoluylene-diisocyanate, α,α,α',α'-tetramethyl-m- and/or -p-xylylene-diisocyanate, 1,6-hexamethylene-diisocyanate, trimethylhexane-diisocyanate, tetramethylhexane-diisocyanate, nonane-triisocyanate, 1-isocyanato-3,3,5-trimethyl-5-isocyanatomethylcyclohexane (isophorone-diisocyanate), 4,4'-diisocyanato-dicyclohexylmethane and/or 2,4'-diisocyanato-dicyclohexylmethane and/or 2,2'-diisocyanato-dicyclohexylmethane and mono- and dimethyl-substituted derivatives thereof.

According to an embodiment, the polyisocyanate is a diisocyanate.

According to a further embodiment of present invention, the structural units C are represented by formula (II) below:

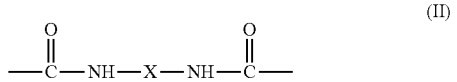

wherein X is a divalent aliphatic group and/or divalent aromatic group, preferably X is alkylene and/or arylene. The alkylene can be, for example, $C_5$-$C_{14}$, preferably $C_3$-$C_{12}$ alkylene, more preferably 1,6-hexamethylene. The arylene can be, for example, $C_8$-$C_{22}$, preferably $C_6$-$C_{20}$ arylene, more preferably 4,4'-methylene diphenyl.

According to a preferred embodiment, the polyisocyanate is 1,6-hexamethylene-diisocyanate and/or 4,4'-diphenyl methane diisocyanate.

A person skilled in the art will appreciate, in the present invention, the structural units C derived from a polyisocyanate are structural units obtained after the reaction between the isocyanate group of the polyisocyanate and hydroxyl group.

The present invention further relates to a method for preparing a transparent copolyester, wherein the method comprises polymerizing lactide, a hydroxyl-terminated aliphatic-aromatic copolyester and a polyisocyanate in the presence of a catalyst. In an embodiment, the weight ratio for the aliphatic-aromatic copolyester, lactide and the polyisocyanate used in said method is 100:(100-2000):(0.1-10).

As will be appreciated by a person skilled in the art, the transparent copolyester of present invention can be prepared by said method of present invention for preparing a transparent copolyester. A person skilled in the art will thus appreciate that the aliphatic-aromatic copolyester segment A in the transparent copolyester according to present invention corresponds to (or derives from) the hydroxyl-terminated aliphatic-aromatic copolyester in said preparing method, the segment (B) having repeating units —O—CH(CH$_3$)—C(O)— derives from the ring-opening polymerization of lactide and the structural units C derives from the polyisocyanate. Therefore, obviously, various properties and characteristics specified with respect to said aliphatic-aromatic copolyester segment A, said segment B having repeating units —O—CH(CH$_3$)—C(O)— and said structural units C derived from a polyisocyanate, are applicable to said lactide, hydroxyl-terminated aliphatic-aromatic copolyester and polyisocyanate in the method.

For example, since the aliphatic-aromatic copolyester segment A corresponds to (or derives from) the hydroxyl-terminated aliphatic-aromatic copolyester in said preparing method, the hydroxyl-terminated aliphatic-aromatic copolyester is almost identical to the aliphatic-aromatic copolyester segment A, except that end groups of them are different. Therefore, the hydroxyl-terminated aliphatic-aromatic copolyester has the same properties and characteristics as those of the aliphatic-aromatic copolyester segment A, such as, for example, types of the repeating units, ratios between repeating units, weight-average molecular weight, polydispersity index and so on. For example, the hydroxyl-terminated aliphatic-aromatic copolyester has a weight-average molecular weight Mw of from 2,000 to 40,000, preferably from 2,500 to 40,000, preferably from 3,000 to 40,000, preferably from 3000 to 30000, preferably from 3500 to 30,000, preferably form 3500 to 20,000 and more preferably from 3500 to 10,000. For example, the polydispersity index (Mw/Mn) of the hydroxyl-terminated aliphatic-aromatic copolyester is from 1.1 to 4, preferably from 1.2 to 2.5.

The hydroxyl-terminated aliphatic-aromatic copolyester used in the transparent copolyester preparing method according to present invention can be produced through conventional preparing methods for polyesters. Such preparing methods for hydroxyl-terminated aliphatic-aromatic copolyesters are well known to those skilled in the art.

For example, a preparing method for the hydroxyl-terminated aliphatic-aromatic copolyester can include the steps of:

(1) adding the following monomers and a first catalyst into a reaction kettle to carry out transesterification reaction and/or esterification reaction: (a) an aromatic diacid, an ester of aromatic diacid, an anhydride of aromatic diacid or a mixture thereof, (b) an aliphatic diol and/or an cycloaliphatic diol, and (c) an aliphatic diacid, a cycloaliphatic diacid, an ester thereof or a mixture thereof, wherein the molar ratio between the total amount of monomer (a) and the total amount of monomer (c) is 1:(0.1-10), preferably 1:(0.2-5), more preferably 1:(0.5-2);

(2) prepolymerizing the reaction system resulted from step (1) under vacuum so as to provide a prepolymer; and (3) subjecting the prepolymer prepared in step (2) and a second catalyst to polycondensation under vacuum to provide the aliphatic-aromatic copolyester;

wherein the first catalyst is at least one selected from titanium compounds, antimony compounds, and zinc compounds; the second catalyst is at least one selected from rare-earth metal compounds, wherein the rare-earth metal is for example at least one selected from lanthanide elements, scandium and yttrium.

In above preparing method for the hydroxyl-terminated aliphatic-aromatic copolyester, the monomers, catalysts, reaction conditions and so on used in steps (1)-(3) may be identical to those described in CN1807485A, with the except that the polycondensation conditions in step (3) can include a temperature of 200-260° C., an absolute pressure of 0-800 Pa and a reaction period of 0.1-2 hours; and amount of monomer (b) is excess relative to the total amount of monomer (a) and monomer (c) and the molar ratio between the total amount of monomer (a) and monomer (c) and amount of monomer (b) is preferably 1:(1.1-1.3).

In the preparing method for the hydroxyl-terminated aliphatic-aromatic copolyester, both end groups of the prepared aliphatic-aromatic copolyester are hydroxyls since the amount of monomer (b) is excess relative to the total amount of monomer (a) and monomer (c).

The polyisocyanate used in the preparing method for the transparent copolyester according to present invention can be various common polyisocyanates that can act as chain extender. For example, those polyisocyanates mentioned above can be used. Preferably, 1,6-hexamethylene-diisocyanate and/or 4,4'-diphenyl methane diisocyanate can be used.

The lactide used in the method according to present invention can be, for example, the lactide described above.

The catalyst used in the preparing method according present invention for transparent copolyester is any catalyst that is capable of initiating and promoting the bulk ring-opening polymerization of lactide. The method of present invention has no particular limits to the catalyst. According to an embodiment, the catalyst is an organic tin compound. According to a preferred embodiment, the organic tin compound is one or more selected from the group consisting of stannous octoate, stannous trifluoromethanesulfonate, dibutyltin dilaurate, stannous tartrate and dibutyldimethoxy tin.

In the preparing method according present invention for transparent copolyester, there are no particular limits to the amount of the catalyst. An amount commonly used for catalyzing ring-opening polymerization of lactide can be employed. According to a preferred embodiment of present invention, the amount of the organic tin compound used is from 0.05 to 0.5 parts by weight, preferably from 0.07 to 0.2 parts by weight, wherein the total weight of the lactide, the aliphatic-aromatic copolyester and the polyisocyanate is 100 parts by weight.

According to an embodiment of present invention, the preparing method according present invention for transparent copolyester is carried out at a temperature of from 130 to 250° C., preferably from 130 to 190° C., more preferably from 170 to 190° C. According to another embodiment of present invention, the preparing method according present invention for transparent copolyester is carried out for from 1 to 20 hours, preferably from 1 to 10 hours, and more preferably from 1.5 to 5 hours.

In a preferred embodiment, in the preparing method according to present invention for transparent copolyester, the reaction vessel containing the lactide, the aliphatic-aromatic copolyester, the polyisocyanate and the catalyst is disposed into an oil bath and the temperature for polymerization is controlled by adjusting the temperature of the oil bath such that the polymerization can be conducted at a constant temperature. The preparing method according to present invention for transparent copolyester can be conducted in the presence of an inert gas. In the method according to present invention, the mixing of the lactide, the aliphatic-aromatic copolyester and the polyisocyanate is preferably carried out in the presence of an inert gas. The inert gas can be, for example, nitrogen or other common inert gases such as argon.

In a preferred embodiment, in the preparing method according to present invention for transparent copolyester, the weight ratio for the aliphatic-aromatic copolyester, lactide and polyisocyanate is 100:(300-700):(1-5). In an embodiment, the transparent copolyester obtained from the method according to present invention has a weight-average molecular weight of 50,000-1,000,000.

According to an embodiment of present invention, the preparing method for transparent copolyester can further comprise dissolving the product resulted from the reaction of the aliphatic-aromatic copolyester, lactide and polyisocyanate with a solvent (for example tetrahydrofuran, chloroform, dichloromethane and so on), precipitating in a precipitating agent (for example, methanol, ethanol and the like) and drying the resulting precipitate, so as to recover the produced transparent copolyester.

The present invention further provides a transparent copolyester prepared by above method. As will be appreciated by those skilled in the art, the transparent copolyester prepared by the method has the properties and characteristics specified hereinbefore with respect to the transparent copolyester according to present invention.

The present invention further relates to articles made from the transparent copolyester according to present invention. The articles are made from a composition, wherein the composition comprises the transparent copolyester of present invention as an essential component or the composition is composed of the transparent copolyester of present invention. For example, the content of the transparent copolyester can be from 5 to 100% by weight, preferably at least 50% by weight, preferably at least 60% by weight, preferably at least 70% by weight, preferably at least 80% by weight, more preferably at least 90% by weight, based on the weight of the composition. According to an embodiment, the content of the transparent copolyester can be from 95 to 100% by weight in the composition.

As will be appreciated by those skilled in the art, the composition for making articles can also comprise various additives. The additives include, but not limited to, plasticizer, thermal stabilizer, lubricant, anti-blocking agent, nucleating agent, biodegradation promote agent, antioxidant, UV absorption agent, antistatic agent, flame-retardant agent, antimicrobial agent, coloring agent, filler and so on, and a mixture thereof. Preferably, the additive can be, for example, pentaerythritol bis(2,4-di-tert-butylphenyl)diphosphite, triphenyl phosphite, and the like. The content of the additive can be from 0.01 to 5% by weight, based on the weight of the composition.

As will be appreciated by those skilled in the art, the articles of present invention can be obtained through various forming processes in resin or plastic industry. For example, the production of the articles of present invention can be carried out via conventional extrusion, injection moulding, bottle-blowing, foaming, sheeting, film-blowing, film-drawing and so on.

For example, when the article is produced by extrusion moulding process, the process can include: mixing the transparent copolyester and an additive uniformly, and heating to melting (for example heating to about 170-210° C.); optionally, removing small molecule substances such as water and the like with the aid of negative pressure (the absolute pressure may be about 0.05-0.095 MPa) during the melting procedure; and extruding the melt into a sheet blank and cooling at a temperature of 25-50° C.

Moreover, as described above, although different features, properties or characteristics may be described in separate embodiments, paragraphs or sentences, those skilled in the art will recognize that these features, properties or characteristics can be combined advantageously, and the presence in separate embodiments, paragraphs or sentences does not mean that the combination of features, properties or characteristics are not feasible and/or favorable.

EXAMPLES

The present invention is further explained through the following examples which do not limit the scope of present invention.

The following substances were used in examples and comparative examples:

L-lactide, from Sigma-Aldrich Inc., 1,6-hexamethylene diisocyanate, from Acros Organics Inc., 4,4'-diphenylmethane diisocyanate, from Acros Organics Inc., tetrabutyl titanate, from Beijing Chemical Reagent Co., Ltd, polybutylene succinate, from Mitsubishi Chemical Holdings Corporation, Japan, under trade name GS-PLA, stannous octoate, from Acros Organics Inc., stannous trifluoromethanesulfonate, from Alfa Aesar., lanthanum acetylacetonate, prepared according to example A2 in CN1807485A, lanthanum stearate, prepared according to example A5 in CN1807485A.

Molecular weight (number-average molecular weight and weight-average molecular weight) and polydispersity index are measured via Gel Permeation Chromatography (GPC) on Waters-208 High Performance Liquid Chromatograph (with a Waters 2410 RI detector, flow rate 1.5 mL/min, 30° C., tetrahydrofuran (THF) as eluent); calibrated by monodisperse linear polystyrene standards.

$^1$H NMR is obtained on a nuclear magnetic resonance apparatus AVANCE 300, Bruker. The solvent is $CDCl_3$ and TMS is used as internal standard.

Tensile strength at break and elongation at break are measured according to China National Standard GB/T 1040.2-2006.

Transmittance is measured according to China National Standard GB/T 2410-2008.

Biodegradability is measured according to China National Standard GB/T 20197-2006.

Example 1

(1) preparation of aliphatic-aromatic copolyester 2.2 mol of terephthalic acid, 5 mol of 1,4-butanediol, 1.6 mmol of tetrabutyl titanate were charged into a 500 mL three-neck flask and heated to reflux under stirring in the presence of $N_2$, wherein the temperature was maintained at 180° C. The distilled water was collected until no further water was generated. 2.5 mol of succinic acid was further added into the system and the system was heated to reflux under stirring, wherein the temperature was maintained at 200° C. The distilled water was collected until no further water was generated. Then the system was prepolymerized at a temperature of 230° C. under an absolute pressure of about 400 Pa for about 1 hour. Finally, 0.85 mmol lanthanum acetylacetonate was added into the system and the system was condensation polymerized at a temperature of 230° C. under an absolute pressure of less than about 200 Pa for about 1 hour, resulting a white aliphatic-aromatic copolyester. The aliphatic-aromatic copolyester has a weight-average molecular weight of 10000, and a polydispersity index of 2.2.

(2) preparation of transparent copolyester 60 g of L-lactide and 30 g of the aliphatic-aromatic copolyester prepared in above (1) were charged into a reactor, respectively. 80 mg of stannous octoate and 0.28 g of 1,6-hexamethylene diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 96%. The weight-average molecular weight of the transparent copolyester is 100,000, and the polydispersity index is 1.86.

$^1$H NMR (300 MHz, $CDCl_3$, δ, ppm): 8.1 (s, —$C_6H_4$—, integrated area 1.00), 5.1-5.2 (m, —OCH($CH_3$)C(O)—, integrated area 2.04), 4.1-4.5 (m, —$CH_2$OC(O)—, integrated area 2.10), 2.6 (t, —C(O)$CH_2$$CH_2$C(O)—, integrated area 1.03), 1.7-2.0 (m, —O$CH_2$$CH_2$—, integrated area 2.05), 1.5-1.6 (d, —OCH($CH_3$)C(O)—, integrated area 6.25), 1.5 (m, —C(O)NH—$CH_2$$CH_2$$CH_2$—, 0.51). See FIG. 1.

With respect to this transparent copolyester, the q in above formula (I) was calculated to be about 16 according to the data of the $^1$H NMR. The average value for q is calculated from the integrated area of characteristic proton peak of polylactic acid segment with a chemical shift of about 5.1-5.2 ppm ($S_{5.2}$) and the integrated area of the proton peak of two methylene groups of 1,6-hexamethylene diisocyanate with a chemical shift of about 1.5 ppm ($S_{1.5}$), wherein $q=S_{5.2} \times 4/S_{1.5}$.

(3) The transparent copolyester obtained in (2) was melted at a temperature of 190° C. under an absolute pressure of 0.09 MPa. The resulting melt was extruded into a sheet blank and then cooled and set at a temperature of 25° C. to provide a sheet A1 with a size of 15 cm×15 cm×2 mm. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B1 with a size of 15 cm×15 cm×2 mm. The biodegradability, tensile strength at break, elongation at break and transmittance of the sheet were then tested and the results are shown in table 2 below.

Comparative Example 1

A comparative copolyester was prepared by repeating Example 1, except that the aliphatic-aromatic copolyester was replaced by the same amount (in mole) of polybutylene succinate (GS-PLA; Mw: about 60,000). This comparative copolyester is a yellow polymer. The weight-average molecular weight of the comparative copolyester is 82,000, and the polydispersity index is 2.15.

In the same way as did in Example 1, a sheet D1 with a size of 15 cm×15 cm×2 mm was made from the prepared polymer. The biodegradability, tensile strength at break, elongation at break and transmittance of the sheet were then tested and the results are shown in table 1 below.

In the same way as did in Example 1, 99 parts by weight of the prepared polymer and 1 part by weight of triphenyl phosphite were mixed uniformly and then a sheet E1 with a size of 15 cm×15 cm×2 mm was made therefrom. The biodegradability, tensile strength at break, elongation at break and transmittance of the sheet were then tested and the results are shown in table 2 below.

Comparative example 2

(1) preparation of aliphatic-aromatic copolyester 2.2 mol of terephthalic acid, 5 mol of 1,4-butanediol, 1.6 mmol of tetrabutyl titanate were charged into a 500 mL three-neck flask and heated to reflux under stirring in the presence of $N_2$, wherein the temperature was maintained at 200° C. The distilled water was collected until no further water was generated. 2.5 mol of succinic acid was further added into the system and the system was heated to reflux under stirring, wherein the temperature was maintained at 220° C. The distilled water was collected until no further water was generated. Then the system was prepolymerized at a temperature of 240° C. under an absolute pressure of about 400 Pa for about 1 hour. Finally, 0.85 mmol lanthanum stearate was added into the system and the system was condensation polymerized at a temperature of 240° C. under an absolute pressure of less than about 200 Pa for about 3 hour, resulting a white aliphatic-aromatic copolyester. The aliphatic-aromatic copolyester has a weight-average molecular weight of 55,000, and a polydispersity index of 1.89.

(2) preparation of comparative copolyester

A comparative copolyester was prepared in the same way as did in step (2) in Example 1, with the except that the aliphatic-aromatic copolyester (Mw 10,000) used in Example 1 was replaced with the aliphatic-aromatic copolyester (Mw 55,000) prepared in above (1). The comparative copolyester was obtained in a yield of 93%. The weight-average molecular weight of the comparative copolyester is 122,000, and the polydispersity index is 2.18.

(3) In the same way as did in Example 1, a sheet D2 with a size of 15 cm×15 cm×2 mm was made from the prepared copolyester. The biodegradability, tensile strength at break, elongation at break and transmittance of the sheet were then tested and the results are shown in table 1 below.

(4) In the same way as did in Example 1, 99 parts by weight of the prepared copolyester and 1 part by weight of triphenyl phosphite were mixed uniformly and then a sheet E2 with a size of 15 cm×15 cm×2 mm was made therefrom. The biodegradability, tensile strength at break, elongation at break and transmittance of the sheet were then tested and the results are shown in table 2 below.

Example 2

(1) preparation of aliphatic-aromatic copolyester
The aliphatic-aromatic copolyester prepared in Example 1 was used.

(2) preparation of transparent copolyester 60 g of L-lactide and 30 g of the aliphatic-aromatic copolyester in above (1) were charged into a reactor, respectively. 80 mg of stannous octoate and 0.28 g of 1,6-hexamethylene diisocyanate were further added and mixed uniformly. The reactor was purged with nitrogen for 5 hours and then the reactor was disposed into an oil bath with a temperature of 190° C. under nitrogen. The reaction was conducted for 1.5 hours and then the reactor was cooled down. The product obtained after the reaction was dissolved in chloroform and then precipitated in anhydrous methanol. The resulting precipitate was dried so as to obtain the transparent copolyester of present invention with a yield of 90%. The weight-average molecular weight of the transparent copolyester is 83,000, and the polydispersity index is 2.11.

$^1$H NMR (300 MHz, $CDCl_3$, δ, ppm): 8.1 (s, —$C_6H_4$—, integrated area 1.00), 5.1-5.2 (m, —$OCH(CH_3)C(O)$—, integrated area 2.12), 4.1-4.5 (m, —$CH_2OC(O)$—, integrated area 2.10), 2.6 (t, —$C(O)CH_2CH_2C(O)$—, integrated area 1.02), 1.7-2.0 (m, —$OCH_2CH_2$—, integrated area 2.00), 1.5-1.6 (d, —$OCH(CH_3)C(O)$—, integrated area 6.31), 1.5 (m, —$C(O)NH$—$CH_2CH_2CH_2$—, integrated area 0.31).

In the same way as did in Example 1, the q in above formula (I) was calculated to be about 27.

(3) In the same way as did in Example 1, a sheet A2 with a size of 15 cm×15 cm×2 mm was made from the prepared copolyester. The biodegradability, tensile strength at break, elongation at break and transmittance of the sheet were then tested and the results are shown in table 1 below.

(4) 99.5 parts by weight of the transparent copolyester prepared in above (2) and 0.5 parts by weight of triphenyl phosphite were mixed uniformly under stirring and the resulting mixture was melted at a temperature of 200° C. under an absolute pressure of 0.08 MPa. The resulting melt was then extruded into a sheet blank and then cooled and set at a temperature of 30° C. to provide a sheet B2 with a size of 15 cm×15 cm×2 mm. The biodegradability, tensile strength at break, elongation at break and transmittance of the sheet were then tested and the results are shown in table 2 below.

Example 3

(1) preparation of aliphatic-aromatic copolyester
The aliphatic-aromatic copolyester prepared in Example 1 was used.

(2) preparation of transparent copolyester 60 g of L-lactide and 30 g of the aliphatic-aromatic copolyester in above (1) were charged into a reactor, respectively. 80 mg of stannous octoate and 1.04 g of 1,6-hexamethylene diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 93%. The weight-average molecular weight of the transparent copolyester is 97,000, and the polydispersity index is 1.79.

$^1$H NMR (300 MHz, $CDCl_3$, δ, ppm): 8.1 (s, —$C_6H_4$—, integrated area 1.00), 5.1-5.2 (m, —$OCH(CH_3)C(O)$—, integrated area 2.33), 4.1-4.5 (m, —CH$_2$OC(O)—, integrated area 2.11), 2.6 (t, —C(O)CH$_2$CH$_2$C(O)—, integrated area 1.08), 1.7-2.0 (m, —OCH$_2$CH$_2$—, integrated area 1.99), 1.5-1.6 (d, —OCH(CH$_3$)C(O)—, integrated area 7.07), 1.5 (m, —C(O)NH—CH$_2$CH$_2$CH$_2$—, integrated area 0.30).

In the same way as did in Example 1, the q in above formula (I) was calculated to be about 31.

(3) In the same way as did in Example 1, a sheet A3 with a size of 15 cm×15 cm×2 mm was made from the prepared copolyester. The biodegradability, tensile strength at break, elongation at break and transmittance of the sheet were then tested and the results are shown in table 1 below.

(4) 98.5 parts by weight of the transparent copolyester prepared in above (2) and 1.5 parts by weight of triphenyl phosphite were mixed uniformly under stirring and the resulting mixture was melted at a temperature of 180° C. under an absolute pressure of 0.07 MPa. The resulting melt was then extruded into a sheet blank and then cooled and set at a temperature of 25° C. to provide a sheet B3 with a size of 15 cm×15 cm×2 mm. The biodegradability, tensile strength at break, elongation at break and transmittance of the sheet were then tested and the results are shown in table 2 below.

Example 4

(1) preparation of aliphatic-aromatic copolyester

The aliphatic-aromatic copolyester prepared in Example 1 was used.

(2) preparation of transparent copolyester 60 g of L-lactide and 20 g of the aliphatic-aromatic copolyester in above (1) were charged into a reactor, respectively. 77 mg of stannous octoate and 0.26 g of 1,6-hexamethylene diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 94%. The weight-average molecular weight of the transparent copolyester is 98,000, and the polydispersity index is 1.98.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 3.22), 4.1-4.5 (m, —CH$_2$OC(O)—, integrated area 2.10), 2.6 (t, —C(O)CH$_2$CH$_2$C(O)—, integrated area 1.03), 1.7-2.0 (m, —OCH$_2$CH$_2$—, integrated area 1.95), 1.5-1.6 (d, —OCH(CH$_3$)C(O)—, integrated area 11.93), 1.5 (m, —C(O)NH—CH$_2$CH$_2$CH$_2$—, integrated area 0.26).

In the same way as did in Example 1, the q in above formula (I) was calculated to be about 50.

(3) In the same way as did in Example 1, a sheet A4 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B4 with a size of 15 cm×15 cm×2 mm. The biodegradability, tensile strength at break, elonga-tion at break and transmittance of the sheet were then tested and the results are shown in table 2 below.

Example 5

(1) preparation of aliphatic-aromatic copolyester

The aliphatic-aromatic copolyester prepared in Example 1 was used.

(2) preparation of transparent copolyester 60 g of L-lactide and 20 g of the aliphatic-aromatic copolyester in above (1) were charged into a reactor, respectively. 81 mg of stannous octoate and 0.28 g of 1,6-hexamethylene diisocyanate were further added and mixed uniformly. The reactor was purged with nitrogen for 5 hours and then the reactor was disposed into an oil bath with a temperature of 190° C. under nitrogen. The reaction was conducted for 1.5 hours and then the reactor was cooled down. The product obtained after the reaction was dissolved in chloroform and then precipitated in anhydrous methanol. The resulting precipitate was dried so as to obtain the transparent copolyester of present invention with a yield of 87%. The weight-average molecular weight of the transparent copolyester is 88,000, and the polydispersity index is 2.13.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 3.34), 4.1-4.5 (m, —CH$_2$OC(O)—, integrated area 2.10), 2.6 (t, —C(O)CH$_2$CH$_2$C(O)—, integrated area 1.03), 1.7-2.0 (m, —OCH$_2$CH$_2$—, integrated area 1.95), 1.5-1.6 (d, —OCH(CH$_3$)C(O)—, integrated area 13.98), 1.5 (m, —C(O)NH—CH$_2$CH$_2$CH$_2$—, integrated area 0.27).

In the same way as did in Example 1, the q in above formula (I) was calculated to be about 49.

(3) In the same way as did in Example 1, a sheet A5 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 parts by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B5 with a size of 15 cm×15 cm×2 mm. The biodegradability, tensile strength at break, elongation at break and transmittance of the sheet were then tested and the results are shown in table 2 below.

Example 6

(1) preparation of aliphatic-aromatic copolyester

The aliphatic-aromatic copolyester prepared in Example 1 was used.

(2) preparation of transparent copolyester 60 g of L-lactide and 20 g of the aliphatic-aromatic copolyester in above (1) were charged into a reactor, respectively. 80 mg of stannous octoate and 1.00 g of 1,6-hexamethylene diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 87%. The weight-average molecular weight of the transparent copolyester is 92,000, and the polydispersity index is 2.25.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 3.58), 4.1-4.5 (m, —CH$_2$OC(O)—, integrated area 2.09), 2.6 (t, —C(O)CH$_2$CH$_2$C(O)—, integrated area 1.03), 1.7-2.0 (m, —OCH$_2$CH$_2$—, integrated area 1.90), 1.5-1.6 (d, —OCH(CH$_3$)C(O)—, integrated area 13.12), 1.5 (m, —C(O)NH—CH$_2$CH$_2$CH$_2$—, integrated area 0.29).

In the same way as did in Example 1, the q in above formula (I) was calculated to be about 49.

(3) In the same way as did in Example 1, a sheet A6 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B6 with a size of 15 cm×15 cm×2 mm. The biodegradability, tensile strength at break, elongation at break and transmittance of the sheet were then tested and the results are shown in table 2 below.

Example 7

(1) preparation of aliphatic-aromatic copolyester
The aliphatic-aromatic copolyester prepared in Example 1 was used.

(2) preparation of transparent copolyester
60 g of L-lactide and 10 g of the aliphatic-aromatic copolyester in above (1) were charged into a reactor, respectively. 80 mg of stannous octoate and 0.24 g of 1,6-hexamethylene diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 95%. The weight-average molecular weight of the transparent copolyester is 96,000, and the polydispersity index is 1.78.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 4.09), 4.1-4.5 (m, —CH$_2$OC(O)—, integrated area 2.03), 2.6 (t, —C(O)CH$_2$CH$_2$C(O)—, integrated area 1.05), 1.7-2.0 (m, —OCH$_2$CH$_2$—, integrated area 1.91), 1.5-1.6 (d, —OCH(CH$_3$)C(O)—, integrated area 13.21), 1.5 (m, —C(O)NH—CH$_2$CH$_2$CH$_2$—, integrated area 0.22).

In the same way as did in Example 1, the q in above formula (I) was calculated to be about 74.

(3) In the same way as did in Example 1, a sheet A7 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B7 with a size of 15 cm×15 cm×2 mm. The biodegradability, tensile strength at break, elongation at break and transmittance of the sheet were then tested and the results are shown in table 2 below.

Example 8

(1) preparation of aliphatic-aromatic copolyester
The aliphatic-aromatic copolyester prepared in Example 1 was used.

(2) preparation of transparent copolyester
60 g of L-lactide and 10 g of the aliphatic-aromatic copolyester in above (1) were charged into a reactor, respectively. 80 mg of stannous octoate and 0.23 g of 1,6-hexamethylene diisocyanate were further added and mixed uniformly. The reactor was purged with nitrogen for 5 hours and then the reactor was disposed into an oil bath with a temperature of 190° C. under nitrogen. The reaction was conducted for 1.5 hours and then the reactor was cooled down. The product obtained after the reaction was dissolved in chloroform and then precipitated in anhydrous methanol. The resulting precipitate was dried so as to obtain the transparent copolyester of present invention with a yield of 90%. The weight-average molecular weight of the transparent copolyester is 90,000, and the polydispersity index is 2.08.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 4.39), 4.1-4.5 (m, —CH$_2$OC(O)—, integrated area 2.18), 2.6 (t, —C(O)CH$_2$CH$_2$C(O)—, integrated area 1.06), 1.7-2.0 (m, —OCH$_2$CH$_2$—, integrated area 1.88), 1.5-1.6 (d, —OCH(CH$_3$)C(O)—, integrated area 14.21), 1.5 (m, —C(O)NH—CH$_2$CH$_2$CH$_2$—, integrated area 0.31).

In the same way as did in Example 1, the q in above formula (I) was calculated to be about 57.

(3) In the same way as did in Example 1, a sheet A8 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B8 with a size of 15 cm×15 cm×2 mm. The biodegradability, tensile strength at break, elongation at break and transmittance of the sheet were then tested and the results are shown in table 2 below.

Example 9

(1) preparation of aliphatic-aromatic copolyester
2.2 mol of terephthalic acid, 5 mol of 1,4-butanediol, 1.6 mmol of tetrabutyl titanate were charged into a 500 mL three-neck flask and heated to reflux under stirring in the presence of N$_2$, wherein the temperature was maintained at 200° C. The distilled water was collected until no further water was generated. 2.5 mol of succinic acid was further added into the system and the system was heated to reflux under stirring, wherein the temperature was maintained at 220° C. The distilled water was collected until no further water was generated. Then the system was prepolymerized at a temperature of 240° C. under an absolute pressure of about 400 Pa for about 1 hour. Finally, 0.85 mmol lanthanum stearate was added into the system and the system was condensation polymerized at a temperature of 240° C. under an absolute pressure of less than about 200 Pa for about 1.5 hour, resulting a white aliphatic-aromatic copolyester. The aliphatic-aromatic copolyester has a weight-average molecular weight of 31,000, and a polydispersity index of 1.67.

(2) preparation of transparent copolyester 60 g of L-lactide and 30 g of the aliphatic-aromatic copolyester in above (1) were charged into a reactor, respectively. 80 mg of stannous trifluoromethanesulfonate and 0.56 g of 4,4'-diphenyl methane diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 87%. The weight-average molecular weight of the transparent copolyester is 81,000, and the polydispersity index is 1.72.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 1.82), 4.1-4.5 (m, —CH$_2$OC(O)—, integrated area 2.01), 3.75 (s, —C$_6$H$_4$—CH$_2$—C$_6$H$_4$—, integrated area 0.09), 2.6 (t, —C(O)CH$_2$CH$_2$C(O)—, integrated area 1.07), 1.7-2.0 (m, —OCH$_2$CH$_2$—, integrated area 1.95), 1.5-1.6 (d, —OCH(CH$_3$)C(O)—, integrated area 5.54).

In the similar way as did in Example 1, the q in above formula (I) was calculated (using the integrated area ratio of the peaks at 5.1-5.2 ppm ($S_{5.2}$) and 3.75 ppm ($S_{3.75}$)) to be about 40, wherein $q=S_{5.2}×2/S_{3.75}$.

(3) In the same way as did in Example 1, a sheet A9 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B9 with a size of 15 cm×15 cm×2 mm. The biodegradability, tensile strength at break, elongation at break and transmittance of the sheet were then tested and the results are shown in table 2 below.

Example 10

(1) preparation of aliphatic-aromatic copolyester

The aliphatic-aromatic copolyester prepared in Example 9 was used.

(2) preparation of transparent copolyester 60 g of L-lactide and 30 g of the aliphatic-aromatic copolyester in above (1) were charged into a reactor, respectively. 80 mg of stannous trifluoromethanesulfonate and 1.28 g of 4,4'-diphenyl methane diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 92%. The weight-average molecular weight of the transparent copolyester is 81,000, and the polydispersity index is 1.84.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 2.09), 4.1-4.5 (m, —CH$_2$OC(O)—, integrated area 2.01), 3.75 (s, —C$_6$H$_4$—CH$_2$—C$_6$H$_4$—, integrated area 0.11), 2.6 (t, —C(O)CH$_2$CH$_2$C(O)—, integrated area 1.01), 1.7-2.0 (m, —OCH$_2$CH$_2$—, integrated area 2.05), 1.5-1.6 (d, —OCH(CH$_3$)C(O)—, integrated area 7.01).

In the same way as did in Example 9, the q in above formula (I) was calculated to be about 38.

(3) In the same way as did in Example 1, a sheet A10 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B10 with a size of 15 cm×15 cm×2 mm. The biodegradability, tensile strength at break, elongation at break and transmittance of the sheet were then tested and the results are shown in table 2 below.

Example 11

(1) preparation of aliphatic-aromatic copolyester

The aliphatic-aromatic copolyester prepared in Example 9 was used.

(2) preparation of transparent copolyester 60 g of L-lactide and 20 g of the aliphatic-aromatic copolyester in above (1) were charged into a reactor, respectively. 80 mg of stannous trifluoromethanesulfonate and 1.12 g of 4,4'-diphenyl methane diisocyanate were further added and mixed uniformly. The reactor was purged with nitrogen for 5 hours and then the reactor was disposed into an oil bath with a temperature of 170° C. under nitrogen. The reaction was conducted for 5 hours and then the reactor was cooled down. The product obtained after the reaction was dissolved in chloroform and then precipitated in anhydrous methanol. The resulting precipitate was dried so as to obtain the transparent copolyester of present invention with a yield of 88%. The weight-average molecular weight of the transparent copolyester is 74,000, and the polydispersity index is 2.04.

$^1$H NMR (300 MHz, CDCl$_3$, δ, ppm): 8.1 (s, —C$_6$H$_4$—, integrated area 1.00), 5.1-5.2 (m, —OCH(CH$_3$)C(O)—, integrated area 2.99), 4.1-4.5 (m, —CH$_2$OC(O)—, integrated area 2.01), 3.75 (s, —C$_6$H$_4$—CH$_2$—C$_6$H$_4$—, integrated area 0.10), 2.6 (t, —C(O)CH$_2$CH$_2$C(O)—, integrated area 1.01), 1.7-2.0 (m, —OCH$_2$CH$_2$—, integrated area 2.05), 1.5-1.6 (d, —OCH(CH$_3$)C(O)—, integrated area 9.13).

In the same way as did in Example 9, the q in above formula (I) was calculated to be about 60.

(3) In the same way as did in Example 1, a sheet A11 with a size of 15 cm×15 cm×2 mm was made from the prepared copolyester. The biodegradability, tensile strength at break, elongation at break and transmittance of the sheet were then tested and the results are shown in table 1 below.

(4) 99 parts by weight of the transparent copolyester prepared in above (2) and 1 part by weight of triphenyl phosphite were mixed uniformly under stirring and the resulting mixture was melted at a temperature of 190° C. under an absolute pressure of 0.09 MPa. The resulting melt was then extruded into a sheet blank and then cooled and set at a temperature of 25° C. to provide a sheet B11 with a size of 15 cm×15 cm×2 mm. The biodegradability, tensile strength at break, elongation at break and transmittance of the sheet were then tested and the results are shown in table 2 below.

TABLE 1

| sheet | Weight-average molecular weight Mw of transparent copolyester | Polydispersity index of transparent copolyester | Degradation rate in 90 days (weight %) | Tensile strength at break (MPa) | Elongation at break(%) | Transmittance (%) |
|---|---|---|---|---|---|---|
| A1 | 100000 | 1.86 | >60 | 25.6 | 44 | 72 |
| D1 | 82000 | 2.15 | >60 | 22.4 | 45 | 45 |
| D2 | 122000 | 2.18 | >60 | 23.4 | 67 | 25 |
| A2 | 83000 | 2.11 | >60 | 24.7 | 38 | 71 |
| A3 | 97000 | 1.79 | >60 | 27.0 | 42 | 69 |
| A4 | 98000 | 1.98 | >60 | 37.5 | 27 | 75 |
| A5 | 88000 | 2.13 | >60 | 36.4 | 25 | 77 |
| A6 | 92000 | 2.25 | >60 | 33.8 | 25 | 73 |
| A7 | 96000 | 1.78 | >60 | 45.3 | 15 | 81 |
| A8 | 90000 | 2.08 | >60 | 40.8 | 12 | 84 |
| A9 | 81000 | 1.72 | >60 | 27.5 | 47 | 78 |
| A10 | 81000 | 1.84 | >60 | 28.2 | 48 | 80 |
| A11 | 74000 | 2.04 | >60 | 46.0 | 25 | 81 |

TABLE 2

| sheet | Degradation rate in 90 days (weight %) | Tensile strength at break (MPa) | Elongation at break (%) | Transmittance (%) |
|---|---|---|---|---|
| B1 | >60 | 25.7 | 45 | 73 |
| E1 | >60 | 22.4 | 45 | 44 |
| E2 | >60 | 23.4 | 67 | 25 |
| B2 | >60 | 24.8 | 39 | 72 |
| B3 | >60 | 27.1 | 43 | 70 |
| B4 | >60 | 37.4 | 29 | 76 |
| B5 | >60 | 36.6 | 28 | 78 |
| B6 | >60 | 33.9 | 27 | 73 |
| B7 | >60 | 45.5 | 17 | 82 |
| B8 | >60 | 40.9 | 15 | 85 |
| B9 | >60 | 27.8 | 48 | 79 |
| B10 | >60 | 28.4 | 49 | 82 |
| B11 | >60 | 46.2 | 28 | 83 |

It can be seen from the data in tables 1 and 2 that the transparent copolyesters and articles thereof of present invention have not only a good biodegradability, but also good toughness and transparency. In particular, the copolymers prepared with the aliphatic-aromatic copolyesters according to present invention as well as articles thereof have better transparencies than the copolymers prepared with aliphatic polyesters as well as articles thereof, as compared between Example 1 and Comparative example 1. The copolymer of Comparative example 2 as well as the article thereof have bad transparencies as compared between Example 1 and Comparative example 2; it is believed that the bad transparency of Comparative example 2 is due to the relative high weight-average molecular weight of the aliphatic-aromatic copolyester employed.

Advantageously, also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the mode contemplated for carrying out this disclosure, but that the disclosure will include all embodiments falling within the scope of the appended claims.

The invention claimed is:

1. A transparent copolyester, comprising:
an aliphatic-aromatic copolyester segment (A);
a segment (B) having repeating units —O—CH(CH$_3$)—C(O)—, represented by formula (I), wherein q=10-100;

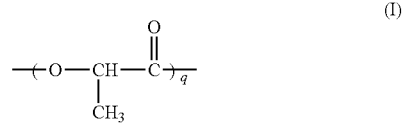

and
structural units (C) derived from a polyisocyanate,
wherein the weight ratio for the aliphatic-aromatic copolyester segment (A), the segment (B) and the structural units (C) derived from a polyisocyanate is 100:(300-700):(0.1-10), and wherein the weight-average molecular weight Mw of the transparent copolyester is from 50,000 to 1,000,000.

2. The transparent copolyester according to claim 1, wherein the transparent copolyester has a transmittance of at least 60%.

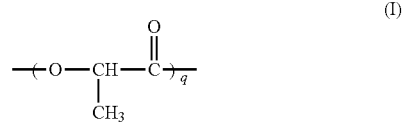

3. The transparent copolyester according to claim 1, wherein the aliphatic-aromatic copolyester segment (A) is a random aliphatic-aromatic copolyester segment.

4. The transparent copolyester according to claim 1, wherein the aliphatic-aromatic copolyester segment (A) has a weight-average molecular weight Mw of 2,000-40,000.

5. The transparent copolyester according to claim 4, wherein the aliphatic-aromatic copolyester segment (A) has a weight-average molecular weight Mw of 3,000-40,000.

6. The transparent copolyester according to claim 1, wherein in the aliphatic-aromatic copolyester segment (A), the molar ratio between aliphatic polyester repeating units and aromatic polyester repeating units is 1:0.1-10.

7. The transparent copolyester according to claim 1, wherein the terminal group of the aliphatic-aromatic copolyester segment (A) is a group derived from a diol.

8. The transparent copolyester according to claim 1, wherein the aliphatic-aromatic copolyester segment (A) contains repeating units represented by formula (III) and repeating units represented by formula (IV), and wherein the chain terminals of the aliphatic-aromatic copolyester segment (A) are each independently —O—$(CH_2)_m$—O— or —O—$(CH_2)_p$—O—,

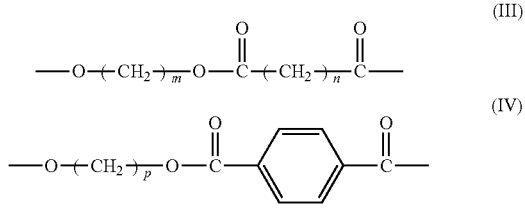

wherein the molar ratio between the repeating units represented by formula (III) and repeating units represented by formula (IV) is 1:0.1-10, m is an integer from 2 to 10, n is an integer from 2 to 8, p is an integer from 2 to 10, and m, n and p are equal to or different from each other.

9. The transparent copolyester according to claim 1, wherein the structural units (C) derived from a polyisocyanate are structural units obtained after the reaction between isocyanate groups of the polyisocyanate and hydroxyl groups.

10. The transparent copolyester according to claim 1, wherein the structural units (C) are represented by formula (II):

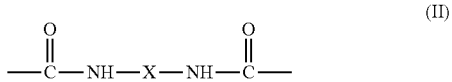

wherein X is chosen from divalent aliphatic groups, divalent aromatic groups, or a combination thereof.

11. The transparent copolyester according to claim 1, wherein the polydispersity index of the transparent copolyester is from 1.2 to 4.

12. The transparent copolyester according to claim 11, wherein the polydispersity index of the transparent copolyester is from 1.5 to 2.5.

13. A method for preparing a transparent copolyester, comprising the step of:
mixing a lactide, a hydroxyl-terminated aliphatic-aromatic copolyester, a polyisocyanate, and a catalyst to form a mixture; and
polymerizing the mixture,
wherein the weight ratio for the hydroxyl-terminated aliphatic-aromatic copolyester, lactide and polyisocyanate is 100:(100-2000):(0.1-10).

14. The method for preparing a transparent copolyester according to claim 13, wherein the catalyst is an organic tin compound.

15. The method for preparing a transparent copolyester according to claim 13, further comprising: keeping a reaction temperature of the mixture at from 130 to 190° C. for a reaction period of from 1 to 10 hours.

16. The method for preparing a transparent copolyester according to claim 15, wherein the reaction temperature is from 170 to 190° C.

17. The method for preparing a transparent copolyester according to claim 15, wherein the reaction period is from 1.5 to 5 hours.

18. The method for preparing a transparent copolyester according to claim 13, wherein the amount of the organic tin compound is from 0.05 to 0.5 parts by weight, wherein the total weight of the lactide, the aliphatic-aromatic copolyester and the polyisocyanate is 100 parts by weight.

19. A transparent copolyester prepared from the method according to claim 13.

20. An article made from the transparent copolyester according to claim 1.

21. The transparent copolyester according to claim 10, wherein X is chosen from 1,6-hexamethylene, 4,4'-methylene diphenyl, or a combination thereof.

22. The method for preparing a transparent copolyester according to claim 14, wherein the organic tin compound is selected from the group consisting of stannous octoate, stannous trifluoromethanesulfonate, dibutyltin dilaurate, stannous tartrate, and dibutyldimethoxy tin.

* * * * *